(12) United States Patent
Khanania

(10) Patent No.: US 8,869,971 B2
(45) Date of Patent: Oct. 28, 2014

(54) SYSTEM AND METHOD FOR PRODUCT REMOVAL

(75) Inventor: Souhel Khanania, Southlake, TX (US)

(73) Assignee: Souhel Khanania, Southlake, TX (US)

( * ) Notice: Subject to any disclaimer, the term of this patent is extended or adjusted under 35 U.S.C. 154(b) by 0 days.

(21) Appl. No.: 13/431,734

(22) Filed: Mar. 27, 2012

(65) Prior Publication Data

US 2012/0181147 A1 Jul. 19, 2012

Related U.S. Application Data

(63) Continuation of application No. 12/347,553, filed on Dec. 31, 2008, now Pat. No. 8,167,114.

(60) Provisional application No. 61/018,827, filed on Jan. 3, 2008.

(51) Int. Cl.
*B65G 45/16* (2006.01)
*B65G 45/12* (2006.01)

(52) U.S. Cl.
CPC ............... *B65G 45/16* (2013.01); *B65G 45/12* (2013.01)
USPC .......................................... 198/499; 198/497

(58) Field of Classification Search
USPC .......................................... 198/497, 498, 499
See application file for complete search history.

(56) References Cited

U.S. PATENT DOCUMENTS

| | | | |
|---|---|---|---|
| 1,458,021 A | 6/1923 | Bamford | |
| 1,991,631 A | 2/1935 | Sangster | |
| 2,670,790 A | 3/1954 | Marble | |
| 2,817,506 A | 12/1957 | Albright | |
| 3,065,741 A | 11/1962 | Gerard | |
| 3,333,123 A | 7/1967 | Baumann | |
| 3,340,037 A | 9/1967 | Stevenson | |
| 3,351,041 A | 11/1967 | Watson et al. | |
| 3,372,635 A | 3/1968 | Meyer | |
| 3,478,704 A | 11/1969 | Ford | |
| 3,622,257 A | 11/1971 | Hein et al. | |
| 3,745,909 A | 7/1973 | Schlotthauer | |
| 3,773,019 A | 11/1973 | Hapgood | |
| 3,782,118 A | 1/1974 | Butter et al. | |

(Continued)

FOREIGN PATENT DOCUMENTS

AU 157926 7/1954
EP 0338995 A1 10/1989

(Continued)

OTHER PUBLICATIONS

Khanania, Souhel, U.S. Appl. No. 12/347,321; "Oven"; Filing Date: Dec. 31, 2008.

*Primary Examiner* — Douglas Hess
(74) *Attorney, Agent, or Firm* — Conley Rose, P.C.; J. Robert Brown, Jr.

(57) ABSTRACT

A product removal method that includes providing a blade adjacent a conveyor belt along a path of the conveyor belt and operating the conveyor belt. A product removal system that has a rod oriented generally parallel to a conveyor drum is disclosed. A frame is rotatably carried by the rod and has a first portion extending adjacent a conveyor belt curved path and a second portion extending adjacent a return plane of the conveyor belt. A blade is adjacent the first portion. A product removal system for an oven is disclosed that has scraper assemblies rotationally biased about an axis of rotation.

19 Claims, 10 Drawing Sheets

(56) References Cited

U.S. PATENT DOCUMENTS

| | | | |
|---|---|---|---|
| 3,799,736 A | 3/1974 | Palladino | |
| 3,831,560 A | 8/1974 | Kühnlein | |
| 3,873,755 A | 3/1975 | McKay | |
| 3,946,856 A | 3/1976 | Herrera | |
| 3,976,188 A | 8/1976 | Herrera et al. | |
| 4,008,996 A | 2/1977 | Wells | |
| 4,036,354 A * | 7/1977 | Reiter | 198/499 |
| 4,059,400 A | 11/1977 | Heckman et al. | |
| 4,109,568 A | 8/1978 | Herrera et al. | |
| 4,202,182 A | 5/1980 | Kawashima et al. | |
| 4,253,821 A | 3/1981 | Bradshaw | |
| 4,395,230 A | 7/1983 | Berry | |
| 4,410,553 A | 10/1983 | McGinty | |
| 4,466,482 A | 8/1984 | Dorazio et al. | |
| 4,554,437 A | 11/1985 | Wagner et al. | |
| 4,583,451 A | 4/1986 | Kanagy | |
| 4,631,029 A | 12/1986 | Lanham et al. | |
| 4,726,766 A | 2/1988 | Stewart et al. | |
| 4,951,648 A | 8/1990 | Shukla et al. | |
| 5,056,518 A | 10/1991 | Pethica et al. | |
| 5,301,797 A * | 4/1994 | Hollyfield et al. | 198/499 |
| 5,429,111 A | 7/1995 | Akamatsu | |
| 5,454,295 A | 10/1995 | Cox et al. | |
| 5,558,885 A | 9/1996 | Herrera | |
| 5,576,033 A | 11/1996 | Herrera | |
| 5,635,235 A | 6/1997 | Sanchez et al. | |
| D383,586 S | 9/1997 | Morales et al. | |
| D383,587 S | 9/1997 | Morales | |
| D383,588 S | 9/1997 | Morales | |
| D383,589 S | 9/1997 | Morales | |
| D383,648 S | 9/1997 | Morales | |
| 5,673,609 A | 10/1997 | Sanchez et al. | |
| 5,674,543 A | 10/1997 | Partida | |
| 5,690,166 A | 11/1997 | Yamaguchi | |
| D391,125 S | 2/1998 | Morales | |
| 5,749,283 A | 5/1998 | Funk | |
| 5,763,861 A | 6/1998 | Herrera et al. | |
| 5,811,137 A | 9/1998 | Clark et al. | |
| 5,875,705 A | 3/1999 | Knost | |
| 5,934,178 A | 8/1999 | Caridis et al. | |
| 5,979,302 A | 11/1999 | Funk et al. | |
| RE37,008 E | 1/2001 | Sanchez et al. | |
| 6,408,842 B1 | 6/2002 | Herrera | |
| 6,530,771 B1 | 3/2003 | Clark | |
| 6,681,919 B1 * | 1/2004 | Brink | 198/499 |
| 6,739,445 B2 | 5/2004 | Armstrong | |
| 6,860,378 B1 * | 3/2005 | Johannsen | 198/497 |
| 6,899,792 B2 * | 5/2005 | Hallberg | 162/199 |
| 7,040,385 B2 | 5/2006 | Higashiyama | |
| 7,086,325 B2 | 8/2006 | Armstrong | |
| 7,131,529 B2 | 11/2006 | Meade | |
| 7,156,644 B2 | 1/2007 | Herrera | |
| 7,222,726 B2 | 5/2007 | Meade | |
| 8,167,114 B2 * | 5/2012 | Khanania | 198/499 |
| 2003/0183494 A1 | 10/2003 | Armstrong | |
| 2004/0121036 A1 | 6/2004 | Herrera | |
| 2005/0000367 A1 | 1/2005 | Meade | |
| 2005/0006208 A1 | 1/2005 | Armstrong | |
| 2006/0070530 A1 | 4/2006 | Meade | |
| 2007/0122517 A1 | 5/2007 | Herrera | |
| 2009/0175988 A1 | 7/2009 | Khanania | |

FOREIGN PATENT DOCUMENTS

| | | |
|---|---|---|
| GB | 707750 | 4/1954 |
| GB | 722711 | 1/1955 |
| WO | 8900392 A1 | 1/1989 |
| WO | 03087668 A1 | 10/2003 |

\* cited by examiner

SYSTEM AND METHOD FOR PRODUCT REMOVAL

CROSS-REFERENCE TO RELATED APPLICATIONS

This application is a continuation of U.S. patent application Ser. No. 12/347,553 filed Dec. 31, 2008, by Souhel Khanania, entitled "System and Method for Product Removal," which claims priority to U.S. Provisional Patent Application No. 61/018,827, filed Jan. 3, 2008, by Souhel Khanania, entitled "Ceramic Scraper Apparatus," both of which are incorporated herein by reference for all purposes.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Foodstuff preparation and/or cooking systems sometimes use conveyer systems having conveyor belts for transporting the foodstuff. In particular some foodstuff ovens comprise conveyer belt systems that transport foodstuff. Still further, many other product handling systems make use of belt based conveyor systems.

SUMMARY OF THE DISCLOSURE

In some embodiments, a method is provided for product removal that comprises providing a blade adjacent a conveyor belt along a path of the conveyor belt. The method further comprises operating the conveyor belt.

In other embodiments, a product removal system is provided that comprises a rod oriented generally parallel to a conveyor drum. The system further comprises a frame rotatably carried by the rod and the frame comprises a first portion extending from the rod to a space adjacent a conveyor belt curved path. The frame further comprises a second portion extending from the rod to a space adjacent a return plane of the conveyor belt. Further, a blade is adjacent the first portion.

In still other embodiments, a product removal system for an oven is provided that comprises a plurality of scraper assemblies. Each of the scraper assemblies is rotationally biased about an axis of rotation to contact a conveyor belt and the magnitude of the rotational bias of each scraper assembly is independently adjustable.

The various characteristics described above, as well as other features, will be readily apparent to those skilled in the art upon reading the following detailed description of the embodiments of the disclosure, and by referring to the accompanying drawings.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

The preparation of foodstuff, such as crackers, chips, and tortillas sometimes involves transporting the foodstuff products on a conveyor belt for purposes such as cooking or the like. When transporting foodstuff on a conveyor belt in this manner, the foodstuff products sometimes undesirably stick to or otherwise adhere to the conveyor belt. The present disclosure discloses maintaining a metal blade in close proximity to or in contact with a conveyor belt so that the blade contacts and removes foodstuff products that are stuck to the conveyor belt. The present disclosure further discloses using a guide for consistently contacting a conveyor belt, thereby maintaining the blade in a selected position relative to the conveyor belt.

Figure 1:
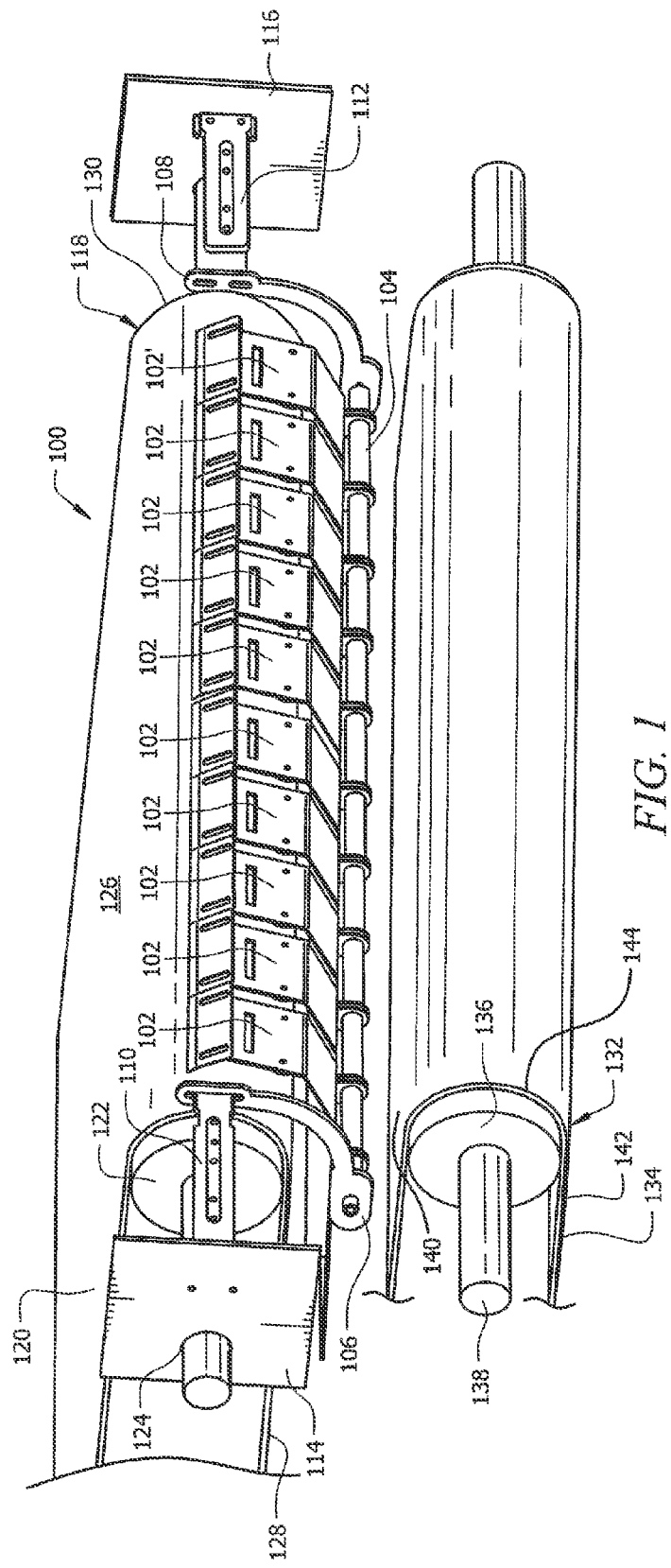
FIG. 1 is a perspective view of a product removal system according to the present disclosure.

Referring now to FIG. 1, a product removal system 100 is shown. Product removal system 100 generally comprises a plurality of scraper assemblies 102 that are each carried by a rod 104. The rod 104 is supported by a front adjustment arm 106 and a rear adjustment arm 108. The front adjustment arm 106 is supported by a front variable support bar 110 that is supported by a front support plate 114. Similarly, the rear adjustment arm 108 is supported by a rear variable support bar 112 that is supported by a rear support plate 116. Each of the above-described components is discussed in greater detail below.

As shown in FIG. 1, the product removal system 100 is used in a production system comprising an upper conveyor 118. The upper conveyor 118 comprises an upper conveyor belt 120 that is mounted around an upper conveyor drum 122. The upper conveyor drum 122 is generally coaxial with an upper conveyor shaft 124 that carries the upper conveyor drum 122. As discussed in greater detail below, the upper conveyor shaft 124 is supported by the front support plate 114 and the rear support plate 116. Upper conveyor 118 generally provides an upper conveyor supply plane 126 along which product is transported.

Figure 2:
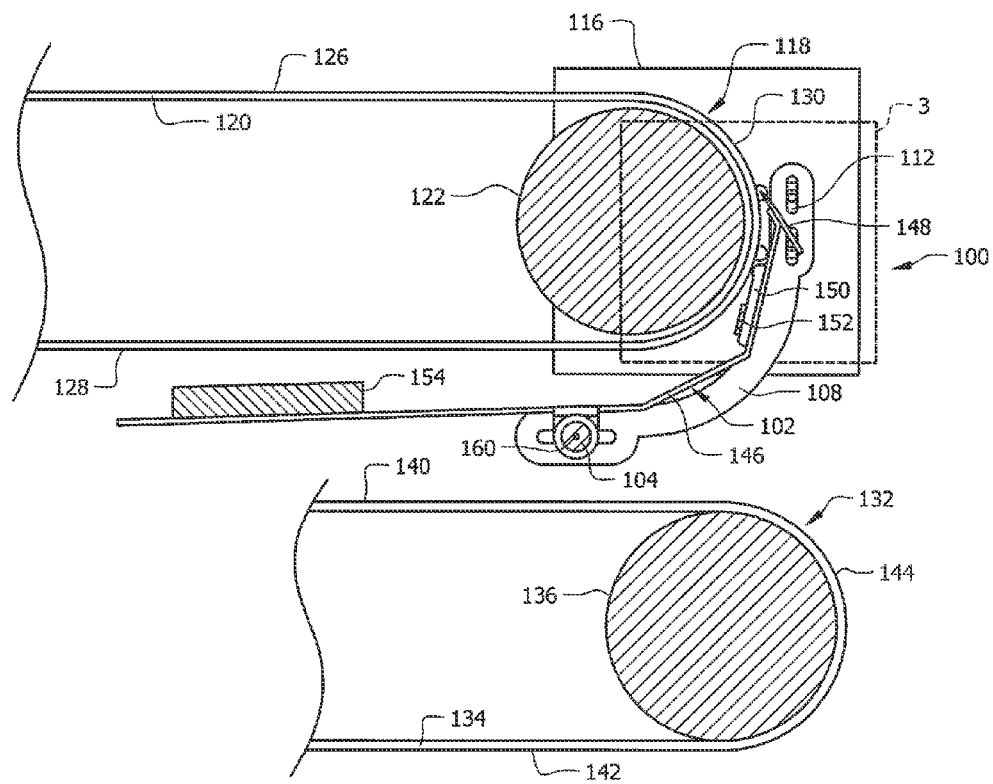
FIG. 2 is a cut-away front view of the product removal system of FIG. 1.
Figure 3:
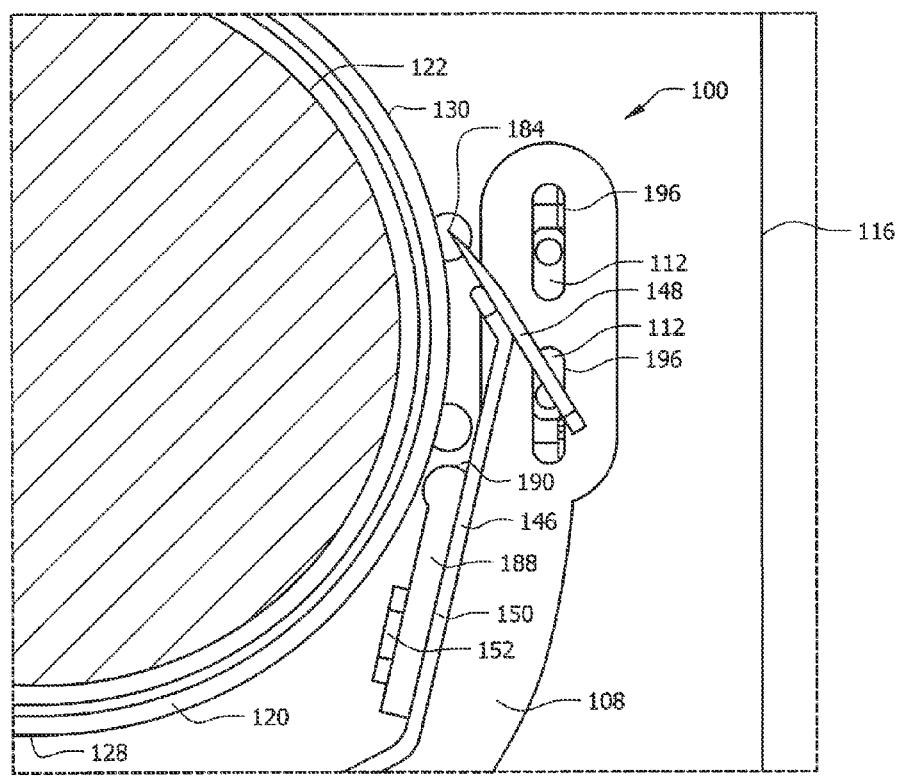
FIG. 3 is a cut-away front detailed view taken from FIG. 2 of the product removal system of FIG. 1.
Figure 4:
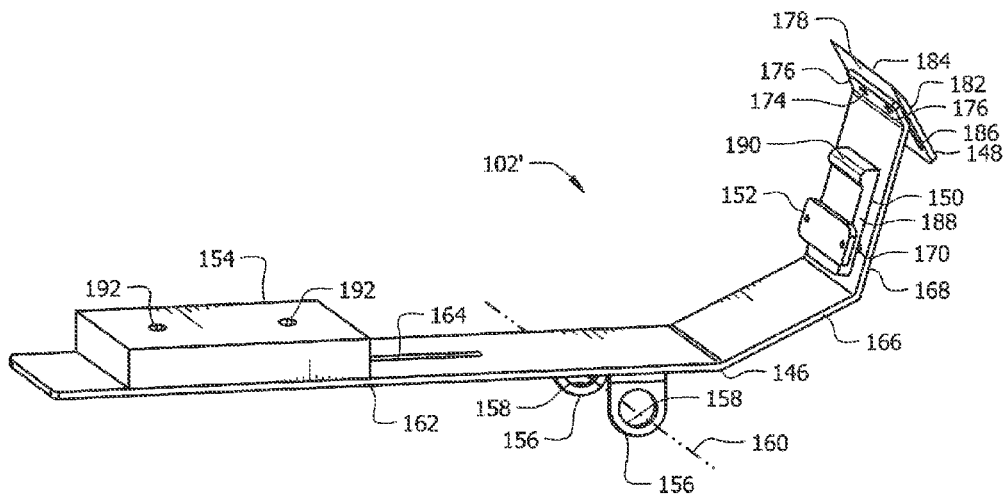
FIG. 4 is a perspective upper view of a scraper assembly of the product removal system of FIG. 1.
Figure 5:
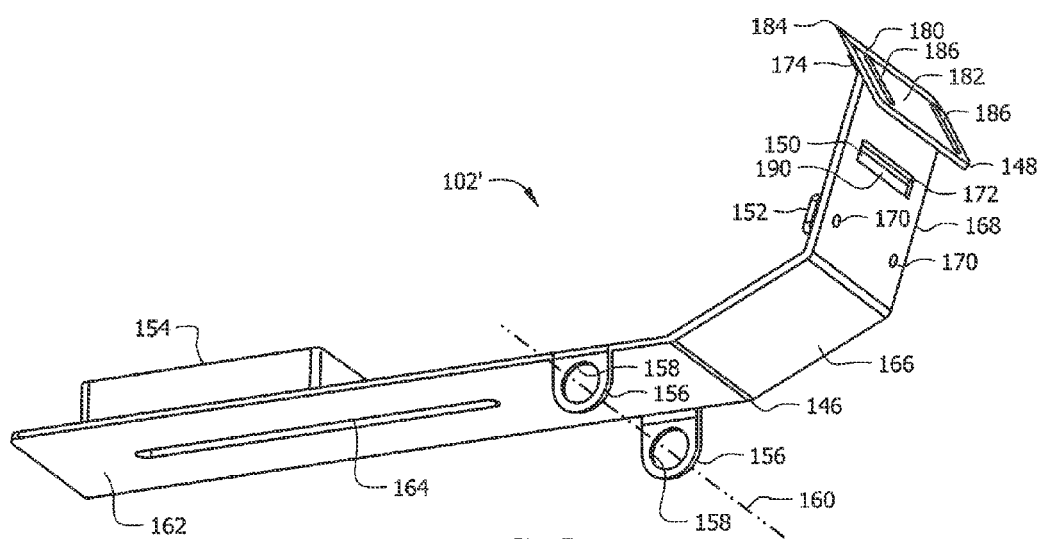
FIG. 5 is a perspective lower view of a scraper assembly of FIG. 4.

Upper conveyor 118 can also generally be described as having an upper conveyor return plane 128 that generally defines a lowermost extent or footprint of the upper conveyor 118. As best shown in FIG. 2, the upper conveyor belt 120 follows an upper conveyor curved path 130 that is related to the outer diameter of the upper conveyor drum 122. The upper conveyor curved path 130 is a path along which the upper conveyor belt 120 travels when moving from the upper conveyor supply plane 126 to the upper conveyor return plane 128.

Still referring to FIGS. 1 and 2, the product removal system 100 is used in a production system further comprising a lower conveyor 132. The lower conveyor 132 comprises a lower conveyor belt 134 that is mounted around a lower conveyor drum 136. The lower conveyor drum 136 is generally coaxial with a lower conveyor shaft 138 that carries the lower conveyor drum 136. Lower conveyor 132 generally provides a lower conveyor supply plane 140 along which product is transported. Lower conveyor 132 can also generally be described as having a lower conveyor return plane 142 that generally defines a lowermost extent or footprint of the lower conveyor 132. As best shown in FIG. 2, the lower conveyor belt 134 follows a lower conveyor curved path 144 that is related to the outer diameter of the lower conveyor drum 136. The lower conveyor curved path 144 is a path along which the lower conveyor belt 134 travels when moving from the lower conveyor supply plane 140 to the lower conveyor return plane 142.

The product removal system 100 operates to remove product (i.e. foodstuff) from the upper conveyor 118 without interfering with the operation of either the upper conveyor 118 or the lower conveyor 132. It will be appreciated that the product removal system 100 is well suited for removing product from the upper conveyor 118 without risk of damaging the upper conveyor 118 or the product removal system 100. In this embodiment, the outer surface of upper conveyor belt 120 that coincides with the upper conveyor supply plane 126 and the upper conveyor return plane 128 is generally flat. The upper conveyor belt 120 may be constructed of rubber, stainless steel, or any other suitable material for providing a generally smooth belt surface. However, it will be appreciated that the product removal system 100 may be used in conjunction with any other type of conveyor belt, including but not limited to chain link conveyor belts. It will be appreciated that in some embodiments, it may be advantageous to implement use of a glide in combination with a blade so that the glide contacts the substantially smooth conveyor belt surface, thereby allowing the glide to dictate the location of the blade with respect to the conveyor belt surface.

In other embodiments where a conveyor belt surface is not substantially smooth (i.e. a chain link conveyor belt), it may be advantageous to implement use of a hard blade to the exclusion of a glide, thereby allowing the blade to move along the irregular surface of the rough or otherwise irregular conveyor belt surface. Of course, in other embodiments, a glide may nonetheless be used in conjunction with a conveyor belt having a rough or irregular surface (i.e. a chain link belt). In still other embodiments, a blade may be used to the exclusion of a glide in conjunction with a smooth conveyor belt. Further, it will be appreciated that the product removal system 100 is well suited for accomplishing removal of product from the upper conveyor 118 even when the lower conveyor supply plane 140 of lower conveyor 132 is in close proximity to the upper conveyor return plane 128 of the upper conveyor 118.

While operation of the product removal system 100 is described in greater detail below, a more detailed description of the components of the product removal system 100 is provided here by first describing a scraper assembly 102' that is representative of the plurality of scraper assemblies 102. Subsequently, the components that support the scraper assemblies 102 are described in greater detail. Finally, the operation of the product removal system 100 is described in view of the more detailed descriptions of the product removal system 100 component structures.

Referring now to FIGS. 3-7, a scraper assembly 102' is shown. Each scraper assembly 102 comprises a frame 146 that carries a blade 148, a glide 150, a glide retainer 152, and a weight 154. It will be appreciated that while the frame 146 and associated carried components are described as being distinct and separate components, in alternative embodiments, a frame or similar structure may integrally comprise any one or more of the above-listed carried components.

Frame 146 generally comprises a plate-like structure that is bent or otherwise formed to comprise a generally L-shaped profile as viewed from the front of the frame 146. The frame 146 comprises two pivot legs 156 that generally extend down from the remainder of the structure of the frame 146. The pivot legs 156, in this embodiment, are generally plate-like protrusions and/or extensions, each having a rod aperture 158 for receiving the rod 104 therethrough. The rod apertures 158 are generally coaxial through-holes that are sized and shaped to allow rotation of the frame 146 about the rod 104 while the rod 104 extends through the rod apertures 158. As assembled for operation, the rod apertures 158 and the rod 104 are generally coaxial about a shared axis of rotation 160. In this embodiment, the pivot legs 156 are carried by a weight support section 162 of the frame 146.

The weight support section 162 is a generally flat plate-like section of the frame 146 that extends tangentially to the axis of rotation 160. As viewed from the front of the frame 146, while the weight support section 162 extends both in the left and right directions away from the axis of rotation 160, the weight support section 162 extends further to the left than to the right. As viewed from above, the weight support section 162 comprises a lengthwise weight mount slot 164. The weight mount slot 164 is generally a slot formed between the upper side and lower side of the weight support section 162. The weight mount slot 164 serves as a convenient aperture for passing fasteners selectively therethrough at various distances along the length of the weight mount slot 164. The weight mount slot 164 enables selective placement of the weight 154 along the length of the weight support section 162. It will be appreciated that in alternative embodiments, a weight may be placed in a different location relative to the axis of rotation 160. Further in alternative embodiments, use of a weight may be replaced by a spring or other biasing device that also leverages a force about an axis of rotation in a manner similar to that accomplished by weight 154.

As viewed from the front of the frame 146, a transition section 166 of the frame 146 extends from a right side of the weight support section 162. The transition section 166 extends generally in a sloped manner in both upward and rightward directions away from the axis of rotation 160. Further, an upright section 168 extends generally vertically upward from the right end of the transition section 166. The upright section comprises two glide mount holes 170 and a glide mount aperture 172. The glide mount holes 170 accept fasteners, such as screws or rivets, while the glide mount aperture 172 is configured to accept a portion of the glide 150 therein. Finally, as viewed from the front of the frame 146, a blade mount section 174 extends from the upper end of the upright section 168 in a sloped manner in both upward and leftward directions. The blade mount section 174 comprises two blade mount holes 176 that are configured to accept fasteners for the purpose of mounting the blade 148 to the blade mount section 174.

Figure 6:
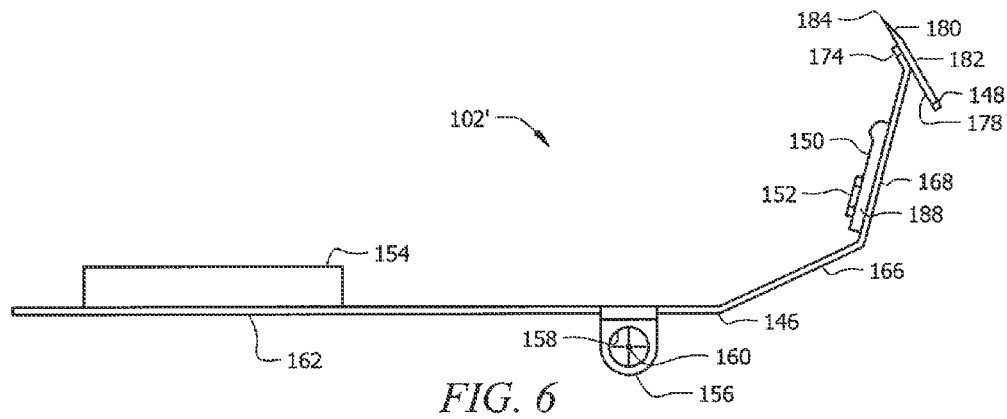
FIG. 6 is a front view of the scraper assembly of FIG. 4.
Figure 7:
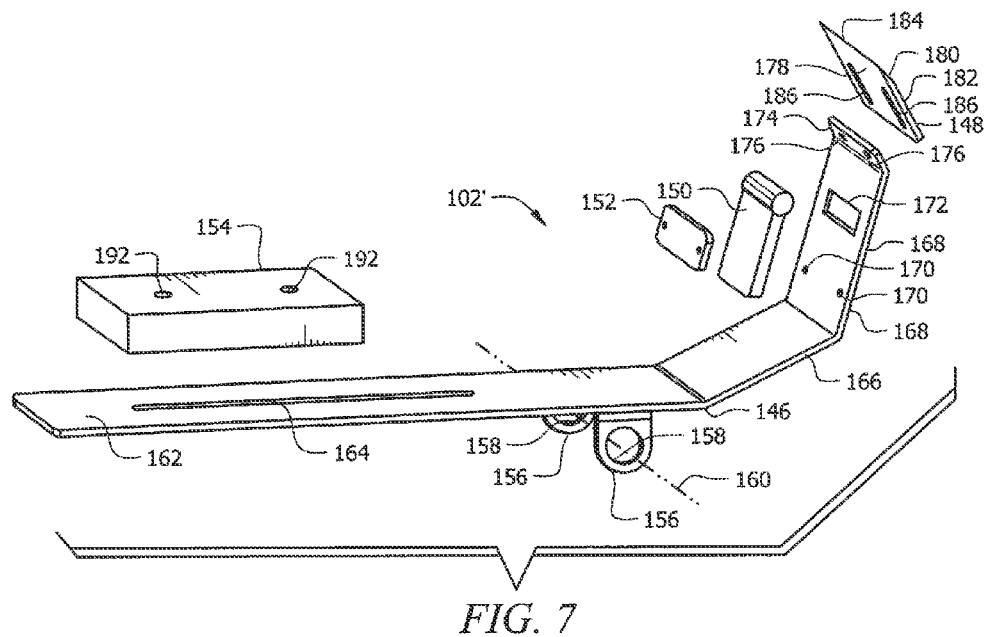
FIG. 7 is a perspective exploded view of the scraper assembly of FIG. 4.

The blade 148 is generally a rectangular plate-like structure comprising a mounting side 178 that generally faces the blade mount section 174 when the blade 148 is attached to and carried by the frame 146. As best shown in FIG. 6, the blade 148 comprises a sloped blade side 180 that transitions the mounting side 178 to an outer side 182. The sloped blade side 180 generally intersects the mounting side 178 to form a blade edge 184. The blade 148 further comprises blade slots 186 that extend through the blade 148 from the mounting side 178 to the outer side 182. The blade slots 186 accept fasteners therethrough and are generally sized and shaped to cooperate with blade mount holes 176 of the blade mount section 174. The blade slots 186 enable easy selection and/or adjustment of the relative location of the blade edge 184 with respect to the blade mount section 174.

The glide 150 generally comprises a rectangular plate-like glide body 188 and a generally cylindrical glide interface 190 integrally attached to a side of the glide body 188. As assembled for operation, the glide 150 is assembled against the upright section 168 with a portion of the glide interface 190 protruding into the glide mount aperture 172 of the upright section 168. In this embodiment, the glide 150 is constructed of ceramic to minimize friction between the glide 150 and the upper conveyor belt 120. However, in alternative embodiments, a glide or any portion of a glide may be constructed of any other suitable material that sufficiently minimizes friction between the glide and a conveyor belt at the points of contact between the glide and the conveyor belt. Further, while the glide 150 is described as having a particular shape and structure, in alternative embodiments, a glide may be formed differently while still providing a low friction interface between the glide and a conveyor belt.

The weight 154 is generally a rectangular structure constructed of metal. The weight 154 comprises weight holes 192 that accept fasteners, such as screws or rivets, therethrough. As assembled for operation, fasteners are passed through a weight hole 192 and into association with a weight mount slot 164 of the weight support section 162.

Figure 8:
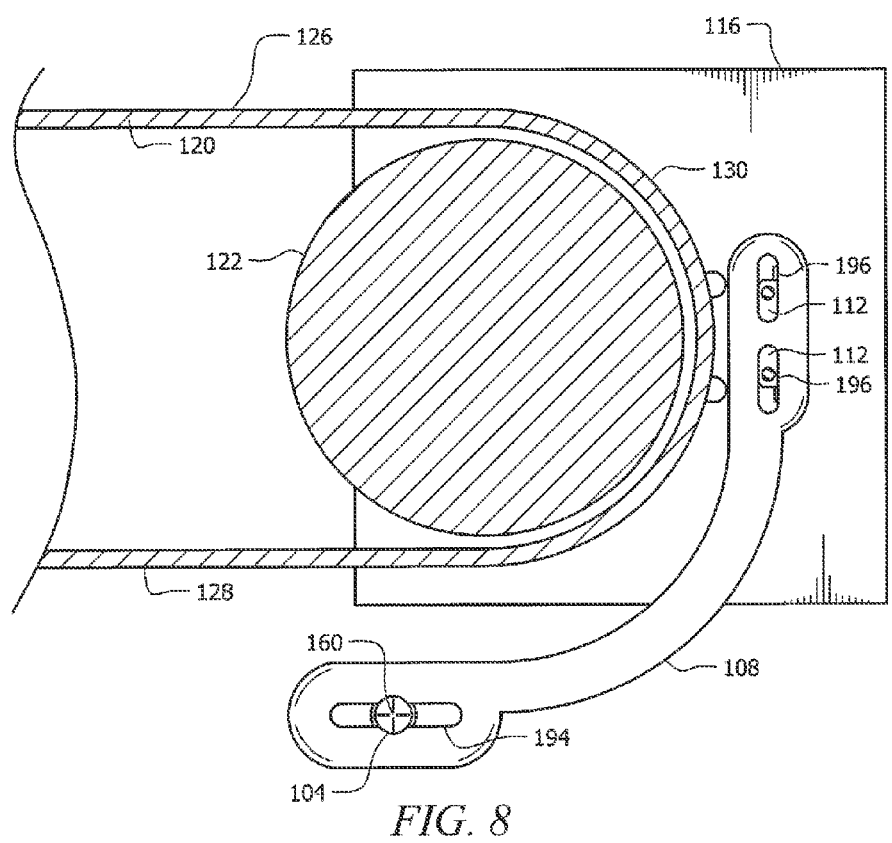
FIG. 8 is a cut-away front view showing some components of the product removal system of FIG. 1.

Referring now to FIG. 8, a cut-away front view of the scraper assembly 100 primarily shows how rod 104 is supported and carried by rear adjustment arm 108. Rear adjustment arm 108 is generally an L-shaped bracket having a lateral slot 194 and two vertical slots 196. More specifically, the lengthwise direction of the lateral slot 194 lies generally parallel to the upper conveyor supply plane 126 while the lengthwise directions of the vertical slots 196 lie generally orthogonal to the upper conveyor supply plane 126. A rear end of the rod 104 is generally fastened to the rear adjustment arm 108 along the lateral slot 194 while a front end of the rod 104 is generally fastened to a similar lateral slot of the front adjustment arm 106 (see FIG. 1).

As previously explained, the rear adjustment arm 108 is connected to the rear support plate 116 by the rear variable support bar 112. Generally, fasteners are passed through vertical slots 196 of rear adjustment arm 108 to engage with support holes 198 of the rear variable support bar 110. The rear variable support bar 110 is secured to the rear support plate 116 using fasteners and is adjustable in length along its lengthwise direction that is generally parallel to the axis of rotation 160.

The plurality of adjustable connections between components of the product removal system 100 ultimately allows selective and precise location of the blade 148 with respect to the upper conveyor belt 120. Specifically, the vertical adjustment between the rear adjustment arm 108 and the rear variable support bar 112 allows raising and lowering of the scraper assemblies 102 so that the blades 148 may be selectively placed along the vertical length of the upper conveyor curved path 130. Also, the lateral adjustment between the rear adjustment arm 108 and the rod 104 allows leftward and rightward movement of the scraper assemblies 102 so that the blades 148 may be selectively placed along the lateral length of the upper conveyor curved path 130. Further, the front adjustment arm 106 and rear adjustment arm 108 may be adjusted, thereby allowing selective movement and/or location of the rod 104 (and consequently all scraper assemblies 102 carried by the rod 104) along the length of the upper conveyor shaft 124. Finally, the blades 148 may be adjusted relative to the blade mount sections 174 along the length of the blade slots 186.

Now, assembly of the product removal system 100 is described, beginning with the assembly of the scraper assemblies 102. A scraper assembly 102 may be assembled by fastening a weight 154 to the weight support section 162 along the weight mount slot 164. Next, a glide 150 may be placed against the upright section 168 so that a portion of the glide interface 190 protrudes into the glide mount aperture 172 of the upright section 168. The glide 150 may then be secured to the upright section 168 by placing the glide retainer 152 against the glide 150 to sandwich the glide body 188 between the glide retainer 152 and the upright section 168. The glide 150 is secured by applying fasteners through glide retainer holes 153 and into association with glide mount holes 170. Further, the blade 148 is attached to blade mount section 174 by passing fasteners through blade slots 186 and into association with blade mount holes 176.

Once the plurality of scraper assemblies 102 have been assembled as described above, they are subsequently mounted in relation to the upper conveyor 118. Such assembly may be accomplished by inserting rod 104 through the plurality of rod apertures 158 so that the scraper assemblies 102 are carried by the rod 104. It will be appreciated that the plurality of scraper assemblies 102 may be distributed along the length of rod 104 in any desired manner. The scraper assemblies 102 may be separated from each other along the length of the rod 104 using suitable spacers or other devices to achieve the desired distribution of scraper assemblies 102 along the length of the rod 104.

Subsequently, the rod 104 is attached to the lateral slots 194 of each of the front adjustment arm 106 and rear adjustment arm 108 so that placement of the front adjustment arm 106 and rear adjustment arm 108 defines placement of the rod 104 and associated scraper assemblies 102. Next, the front adjustment arm 106 and rear adjustment arm 108 are attached to the front variable support bar 110 and rear variable support bar 112, respectively. Finally, the front variable support bar 110 and rear variable support bar 112 are attached to the front support plate 114 and rear support plate 116, respectively.

Once the components have been assembled as described above, selective adjustments to the location of the blade edge 184 relative to the upper conveyor belt 120 may be made using the front and rear variable support bars 110, 112, the lateral slots 194 and vertical slots 196 of the front and rear adjustment arms 106, 108, and the blade slots 186. With proper adjustment, the blade edge 184 is brought into close proximity of the upper conveyor belt 120 along the upper conveyor curved path 130. In this position, the glide interface 190 of the glide 150 is in contact with the upper conveyor belt 120 and the interface 190 exerts a force on the upper conveyor belt 120 that is directed generally toward the upper conveyor drum 122. However, it will be appreciated that in other embodiments, a blade may be adjusted to contact a conveyor belt simultaneously with a glide.

It will be appreciated that a magnitude of the force exerted on the upper conveyor belt 120 by the glide interface 190 may be adjusted by adjusting the location of the weight 154 along the length of the weight support section 162. Specifically, the magnitude of the force exerted on the upper conveyor belt 120 by the glide interface 190 may be increased by moving the weight 154 along the length of the weight support section 162 in a direction away from the transition section 166 (i.e., further away from the axis of rotation 160). Moving the weight 154 further away from the transition section 166 increases the torque applied to the frame 146 about the axis of rotation 160 and in turn causes the glide interface 190 to press against the upper conveyor belt 120 with a larger force. It will be appreciated in this embodiment, each of weights 154 of the various scraper assemblies 120 are adjusted to provide substantially similar magnitudes of torque. However, in alternative embodiments, weights may be individually adjusted to provide different torque magnitudes, effectively causing the various glide interfaces 190 to press against the upper conveyor belt 120 with different magnitudes of force. It will be appreciated that in other embodiments where a blade contacts a conveyor belt, the above-described adjustments may similarly be made to change the amount of force with which the blade contacts the conveyor belt.

Referring generally to FIG. 2, the product removal system 100 is used to remove foodstuff products (or other items) from the upper conveyor 118. Specifically, as the upper conveyor 118 is operated to rotate upper conveyor drum 122 in a clockwise direction, the upper conveyor belt 120 carries product from left to right (as viewed in FIG. 2) along the upper conveyor supply plane 126. As a product passes into the upper conveyor curved path 130, the product may naturally become separated from the upper conveyor belt 120 and be discarded from the upper conveyor 118 in a rightward direction. However, when the product is sticky or otherwise adhered to the upper conveyor belt 120, the product removal system 100 is helpful in removing the product. The product removal system 100 is also beneficial in that the blade 148 is maintained in a substantially constant position relative to the portion of the upper conveyor belt 120 along the upper conveyor curved path 130, thereby not contacting the upper conveyor belt 120 directly. However, as described above, it will be appreciated that in other embodiments, a blade may be directly in contact with a conveyor belt while still allowing operation of the product removal system in substantially the manner described with respect to product removal system 100.

As a product that is stuck to the upper conveyor belt 120 travels along the upper conveyor curved path 130, the product eventually comes into contact with the blade edge 184 of the blade 148. Further travel of the product along the upper conveyor curved path 130 forces the product to further come into contact with and slide along the sloped blade side 180 and then past the outer side 182 of the blade 148, thereby peeling the product away from the upper conveyer belt 120.

However, it will be appreciated that in alternative embodiments, additional structures and/or devices may be used in conjunction with the above-described product removal system 100. In some alternative embodiments, a product orientation structure may be located so that a product removed from a conveyor belt by a product removal system substantially similar to product removal system 100 is guided by the product orientation structure. More specifically, the product orientation structure may comprise a sloped wall along which the removed product contacts and is thereby directed downward onto a second conveyor belt located generally lower and/or below the conveyor belt from which the product was initially removed. Further, the product orientation structure may be provided so that the removed product is flipped, turned, or otherwise oriented on the second belt in a manner different from which the product was oriented on the conveyor belt from which the product was initially removed. Further, the product orientation structure may generally serve to direct passage of the removed product from the initial belt to a lower belt, thereby continuing the product along a cooking path and orienting the product differently so that the product is cooked evenly and/or in a predetermined manner.

It will be appreciated that any inconsistencies in upper conveyor belt 120 operation such as belt jumping and/or lurching in a leftward or rightward direction (as viewed in FIG. 2) do not typically interrupt the contact between the upper conveyor belt 120 and the glide 150. Instead, the torque caused by the weight 154 serves, as described above, to rotate the frame 146 so that contact between the glide interface 190 and the upper conveyor belt 120 is maintained in spite of any upper conveyor belt 120 operation inconsistencies. By maintaining the predetermined orientation between the blade 148 and the upper conveyor belt 120, products that are travelling or stuck to the upper conveyor belt 120 are removed from the upper conveyor belt 120 even when the upper conveyor belt 120 operates inconsistently or undesirably. It will further be appreciated that, in this embodiment, due to both the upper conveyor drum 122 and the product removal system 100 being commonly mounted to and carried by the front support plate 114 and rear support plate 116, the upper conveyor drum 122 may be moved without necessitating adjustment of the product removal system 100. However, it will be appreciated that in other embodiments where a blade contacts a conveyor belt, the contact between the blade and the conveyor belt may be maintained in a manner substantially similar to that described above with respect to the contact between the glide 150 and the upper conveyor belt 120.

While the product removal system 100 employs the use of weight 154 to rotationally bias the glide 150 against the upper conveyor belt 120, it will be appreciated that, in other embodiments, any other suitable means of biasing a glide against a conveyor belt may be used. In alternative embodiments, a conveyor drum and/or a conveyor belt may be biased toward a glide. In further alternative embodiments, a conveyor belt and a glide may both be biased toward each other. Further, in alternative embodiments, the glide may be biased toward a conveyor belt but not actually contact the conveyor belt during normal operation of the conveyor belt (i.e. so that irregularities in the conveyor belt operation cause contact between the glide and the conveyor belt). Again, in alternative embodiments where a blade contacts a conveyor belt, the above-described biasing techniques may equally apply to biasing between the blade and the conveyor belt.

Figure 9:
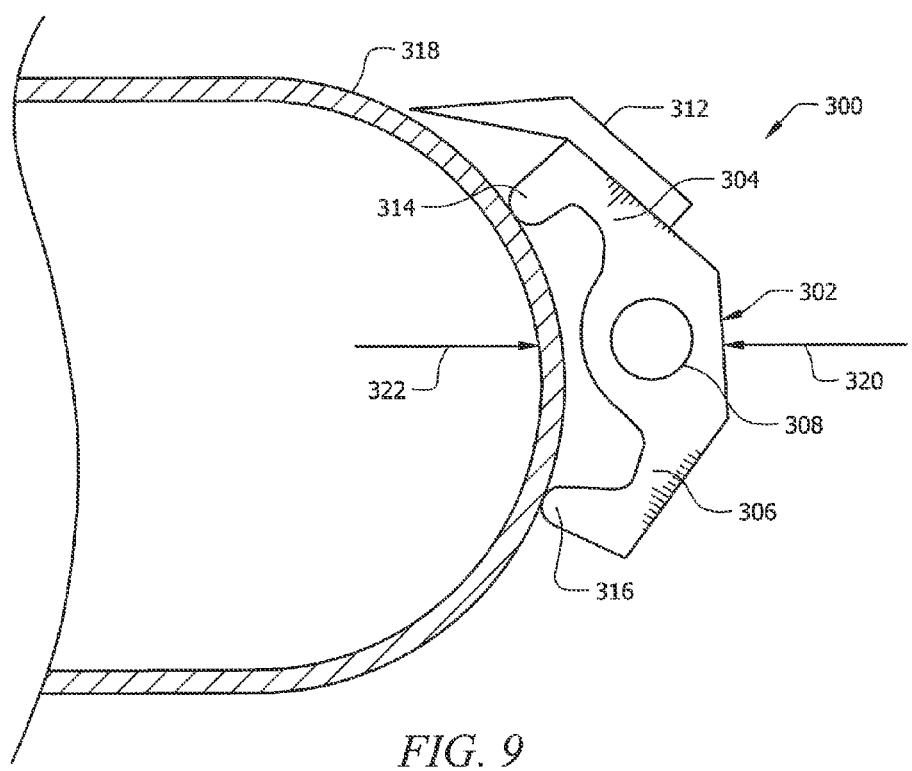
FIG. 9 is a simplified front view of another embodiment of a product removal system.
Figure 10:
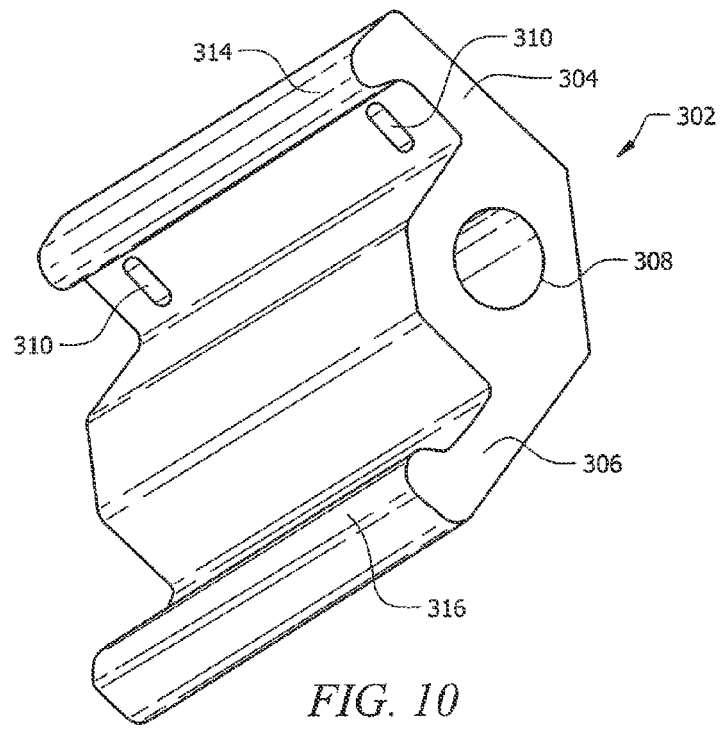
FIG. 10 is an oblique view of a dual contact glide of the product removal system of FIG. 9.

Referring now to FIGS. 9 and 10, a product removal system 300 comprising a dual contact glide 302 is shown. Dual contact glide 302 comprises a first contact arm 304 a second contact arm 306 and a dual contact mounting aperture 308 for receiving a rod. The first contact arm 304 comprises blade mount apertures 310 for use in attaching a blade 312 substantially similar to blade 148 to the first contact arm 304. Blade 312 differs from blade 148 at least in that blade 312 comprises a bent portion that angles toward the conveyor belt 318 from and edge of the dual contact glide 302. Further, the first contact arm 304 comprises a first contact interface 314 while the second contact arm 306 comprises a second contact interface 316. Each of the first and second contact interfaces 314, 316 are well suited for maintaining contact with a conveyor belt 318, thereby keeping the blade 312 that is carried by the dual contact glide 310 in a constant position relative to the conveyor belt 318.

The dual contact glide 302 may be held in contact with the conveyor belt 318 by mounting the dual contact glide 302 to a rod by passing the rod through the mounting aperture 308.

While mounted on a rod, the dual contact glide 302 rotates about the rod to maintain contact between the conveyor belt 318 and the first and second contact interfaces 314, 316. Further, the glide 302 may be biased toward the conveyor belt 318 using a spring or other suitable biasing system for biasing the dual contact glide 302 leftward (as generally indicated by arrow 320) toward the belt 318. Alternatively or in addition to the biasing indicated by arrow 320, the conveyor belt 318 may be biased rightward (as generally indicated by arrow 322) toward the dual contact glide 302 which could be substantially fixed.

Of course, the biasing provided as shown by arrows 320, 322 and any other biasing disclosed herein may be provided by and/or replaced by any suitable spring set, leverage arm system, hydraulic pressure system, pneumatic pressure system, and/or any other suitable system or device. Further, it will be appreciated that while glides are generally disclosed as being biased against conveyor belts, in alternative embodiments, the conveyor belts (and/or associated conveyor drums) may be biased toward the glides. Still further, it will be appreciated that, in alternative embodiments, one or more of the conveyor belt, conveyor drum, glides, rods, or other components may be independently biased to provide the contact between a glide and a conveyor belt of a system. It will be appreciated that, in alternative embodiments where a blade contacts a conveyor belt, the biasing techniques described above may be used to accomplish biasing between the blade and the conveyor belt.

Figure 11:
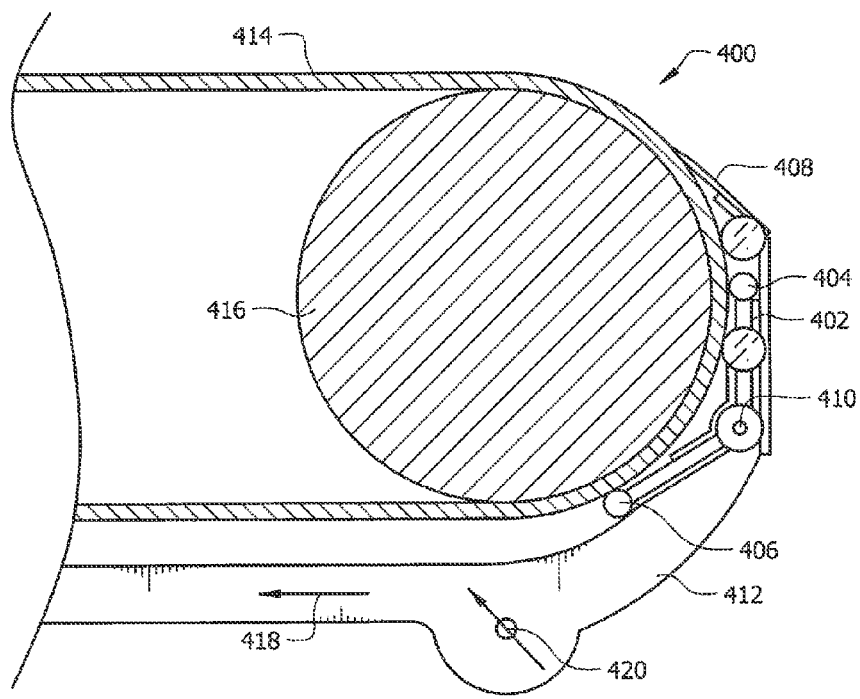
FIG. 11 is a front view of another embodiment of a product removal system.

Referring now to FIG. 11, a product removal system 400 is shown. Product removal system 400 comprises a glide 402 having an upper glide interface 404 and a lower glide interface 406. Product removal system 400 further comprises a blade 408 and a rod 410. The components of the product removal system 400 are carried and supported by a support arm 412. The support arm 412 remains substantially stationary with respect to the belt 414 and drum 416. However, the glide 402 and blade 408 are free to rotate about support rod 410 to provide constant contact between the belt 414 and the upper and lower glide interfaces 404, 406 while maintaining a selected gap between the blade 408 and the belt 414. The support arm 412 is biased in a leftward direction (as generally indicated by arrow 418) so that the upper glide interface 404 and lower glide interface 406 contact the belt 414. However, it will be appreciated that in alternative embodiments, a support arm may be biased in a different direction that also provides contact between glide interfaces and the belt. One such different direction is generally indicated by arrow 420 that shows how an arm may be biased in an upward and leftward direction to cause contact between glide interfaces and the belt. It will further be appreciated that while guides having one and two interfaces for contacting a belt are disclosed, alternative embodiments of a guide may have any number of interfaces for contacting a conveyor belt. Still further, it will be appreciated that an alternative embodiment substantially similar to product removal system 400 may comprise no glide 402 and instead provide contact between a blade and a conveyor belt.

The various components of the product removal systems 100 and 400 may be constructed of a variety of materials. For example, the glide 150 is constructed of ceramic and the blade 148 is constructed of tool steel. Further, a blade may be constructed of machined and/or heat treated, and/or otherwise processed metal to be relatively hard (i.e. having a Rockwell hardness of about 60 HRC or higher) to enable contact with a metallic chain link conveyor belt without chipping or breaking the blade. Blades that are relatively hard are well suited for use in product removal systems where there is no glide, but rather, the blade itself contacts a conveyor belt while the conveyor belt is operated. Constructing the glide 150 and other glides of ceramic is beneficial because the ceramic generally provides a low friction interface with the conveyor belts, the ceramic is well-suited for use in a high heat environment (i.e. within an oven), and the ceramic resists failure while under compression (i.e. while pressed against conveyor belts). Further ceramic is relatively hard and resists wear due to abrasive contact with conveyor belts. However, in alternative embodiments, glides may be constructed of any other suitable material, such as plastic or other low friction and/or hard material. Further, in alternative embodiments, blades may be constructed of any other material suitable for removing products from the conveyor belt. Frame 146 is constructed of stainless steel. However, in alternative embodiments, a frame may be constructed of any other suitable material. Where product removal systems 100, 400 are used inside an oven, the materials should be capable of withstanding high temperatures without failure.

Figure 12:
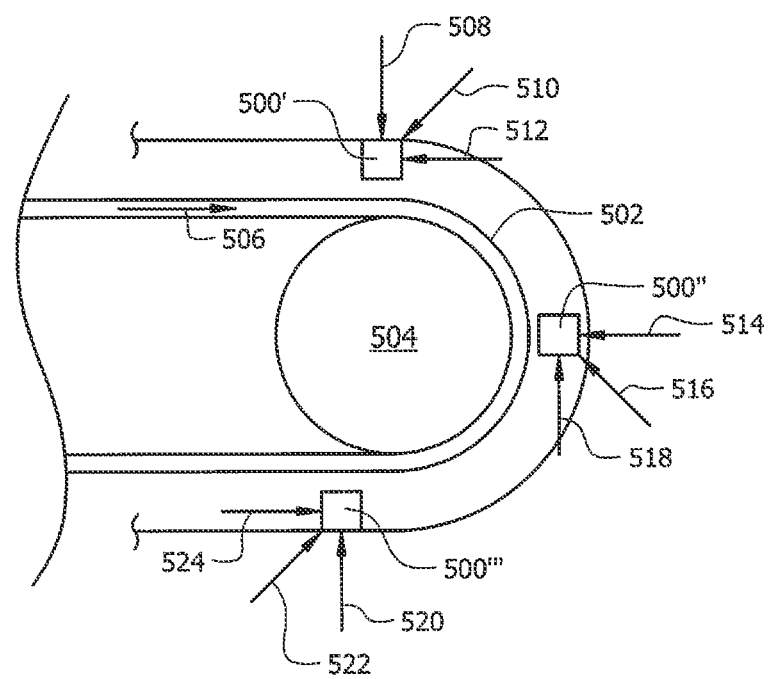
FIG. 12 is a simplified diagram showing alternative locations of scraper assemblies.

Referring now to FIG. 12, a simplified schematic diagram shows how scraper assemblies 500 may be located relative to a conveyor belt 502 and conveyor drum 504. In this diagram, the conveyor belt generally rotates about the drum 504 in the direction indicated by arrow 506. Specifically, scraper assembly 500' is located generally above conveyor belt 502 and may be biased downward, leftward and downward, or leftward as indicated by arrows 508, 510, 512, respectively. Scraper assembly 500'' is located generally to the right of conveyor belt 502 and may be biased leftward, leftward and upward, or upward as indicated by arrows 514, 516, 518, respectively. Scraper assembly 500''' is located generally below conveyor belt 502 and may be biased upward, upward and rightward, or rightward as indicated by arrows 520, 522, 524, respectively. Of course, biasing of any of the scraper assemblies 500 may be accomplished using any of the above-described systems and devices for providing a biasing force (i.e. leverage arms, springs, and/or other mechanical systems). Further, it will be appreciated that the drum 504 and/or the belt 502 may also be biased toward any one or more of the scraper assemblies 500. It will be appreciated that in alternative embodiments, the above described scraper assembly placements and biasing of the scraper assemblies may be applied to scraper assemblies where a blade contacts the conveyor belt and/or where both a blade and a glide contact a conveyor belt.

Figure 13:
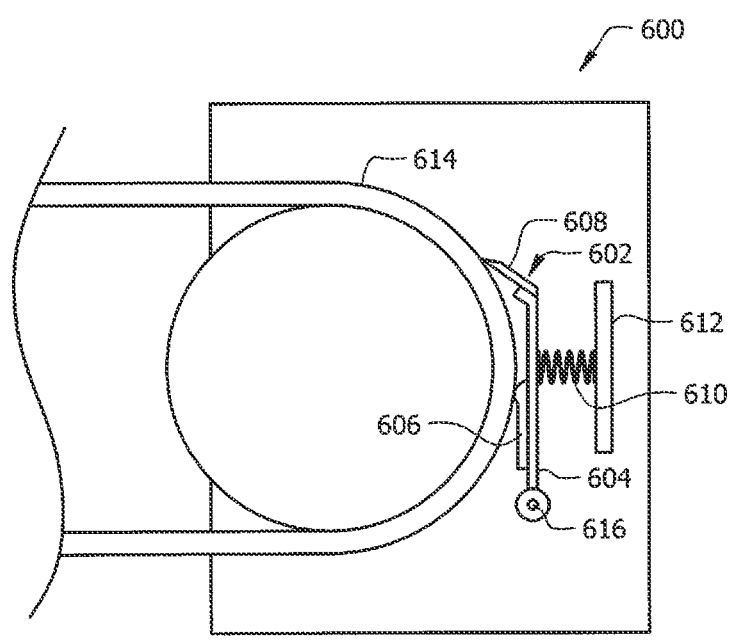
FIG. 13 is a simplified front view of another embodiment of a product removal system.

Referring now to FIG. 13, a simplified front view of a product removal system 600 that is substantially similar to product removal system 100. Product removal system 600 comprises a scraper assembly 602 that comprises a frame 604 that carries a glide 606 substantially similar to glide 150 and a blade 608 substantially similar to blade 148. Product removal system 600 differs from product removal system 100 in that the scraper assemblies 602 are not biased using a force generated by a weight, but rather, a spring 610 is captured between the frame 604 and a backup plate 612 to provide the biasing force. More specifically, the spring 610 is in a compressed state between the backup plate 612 and the frame 604 so that the spring pushes the frame 604 and consequently the glide 606 leftward toward the conveyor belt 614. Of course, such a spring biasing mechanism may also be used in an alternative embodiment of a product removal system where a blade is biased into contact with a conveyor belt and/or where both a blade and a glide are biased into contact with a conveyor belt.

In short, the spring 610 biases the glide 606 against the conveyor belt 614. In this embodiment, the frame 604 is pivots about an axis of rotation 616 that may be associated with a rod or other device that allow rotation of the frame 604.

In this embodiment, scraper assemblies 602 may be provided with different biasing forces by providing springs 610 having different spring constants. As previously discussed, it will be appreciated that in alternative embodiments, the springs 610 may be replaced in form and function by other suitable mechanical systems such as, but not limited to, a pneumatic system comprising a pneumatic piston.

Figure 14:
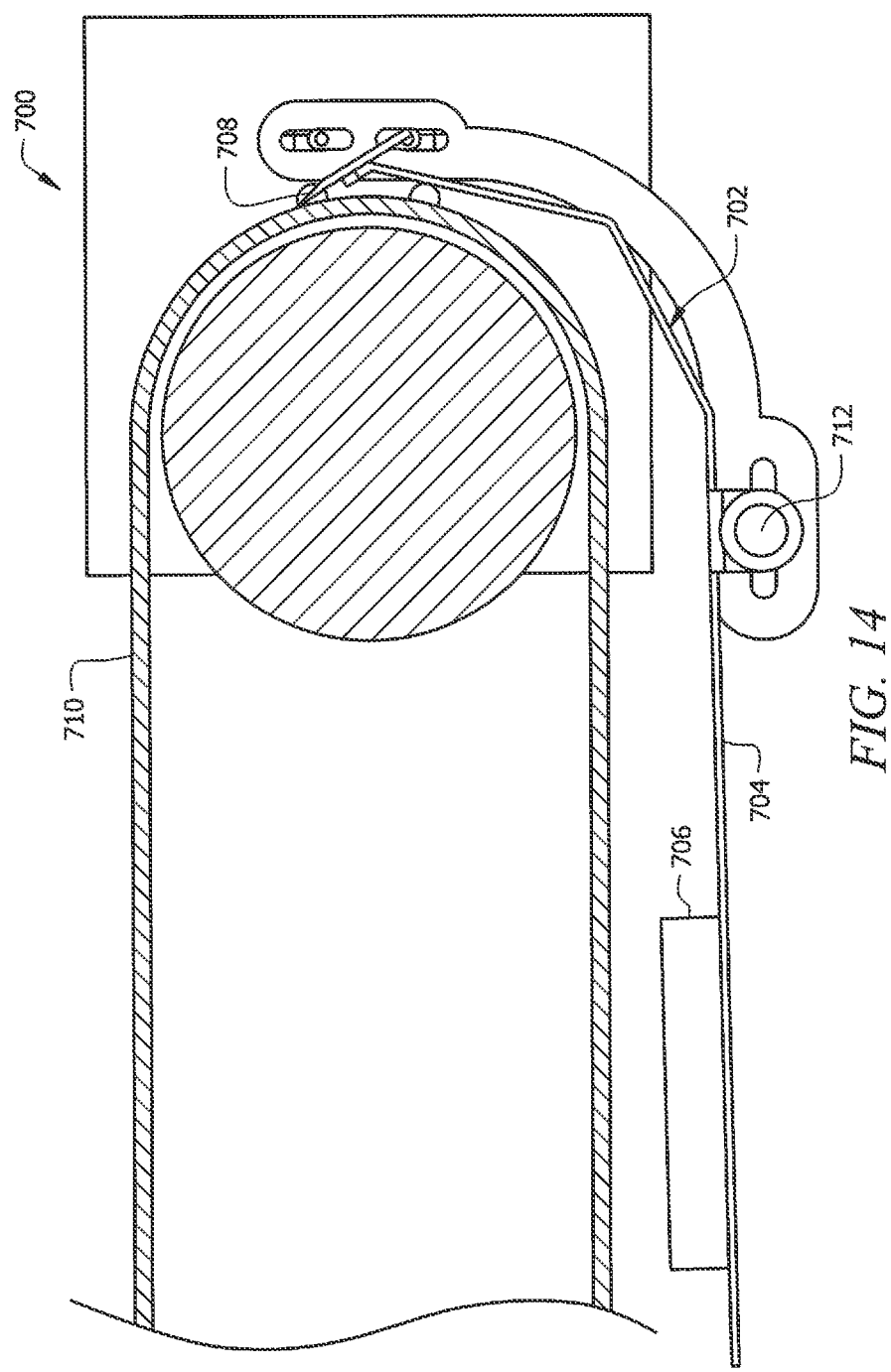
FIG. 14 is a cut-away front view of another embodiment of a product removal system.

Referring now to FIG. 14, a product removal system 700 is shown. Product removal system 700 is substantially similar to product removal system 100 in form and function but for a few differences. Product removal system 700 comprises no glide and no associated glide retainer. Instead, the product removal system 700 comprises scraper assemblies 702 comprising a frame 704 substantially similar to frame 146 that carries a weight 706 and a blade 708 that are substantially similar to weight 154 and blade 148, respectively. However, blade 708 is specifically constructed of a hardened material such as, but not limited to, a hardened steel having a Rockwell hardness of about 60 HRC or higher so that the blade 708 can withstand contacting the metal chain link conveyor belt 710 as the conveyor belt 710 is operated. The product removal system 700 operates to bias the blade 708 toward the conveyor belt 710 in substantially the same manner product removal system 100 operates to bias the glide 150 into contact with the upper conveyor belt 120 (i.e. by rotating frame 704 about rod 712).

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present invention. The discussion of a reference in the disclosure is not an admission that it is prior art, especially any reference that has a publication date after the priority date of this application.

What is claimed is:

1. A method of product removal, comprising:
   providing a continuous conveyor belt disposed along (1) an upward facing supply path (2) a downward facing return path, and (3) a curved path between the supply path and the return path;
   rotating the belt in a direction selected to progressively move a portion of the belt from the supply path to the return path via the curved path;
   providing a plurality of blades in contact with the belt along the curved path, each of the blades being both (1) at least partially independently movable relative to the belt and (2) at least partially independently biased into contact with the belt; and
   removing a product carried by the belt from the belt by moving the product along a product removal path that lies at least partially vertically above the blade.

2. The method of claim 1, wherein the plurality of blades contact the belt along a portion of the curved path prior to a change in longitudinal direction of travel of the belt.

3. The method of claim 1, wherein the plurality of blades contact the belt along a top one half portion of the curved path.

4. The method of claim 1, wherein at least one of the plurality of blades is biased through the use of a gravitational force.

5. The method of claim 1, wherein at least one of the plurality of blades is biased through the use of a spring force.

6. The method of claim 1, further comprising:
   locating at least one of the plurality of blades between the belt and a product carried by the belt.

7. The method of claim 1, wherein the product is supported by both the belt and the blade during a portion of the removing the product.

8. The method of claim 7, wherein the belt is a chain link belt.

9. The method of claim 8, wherein the product is foodstuff.

10. A product removal system, comprising:
    a continuous conveyor belt configured to selectively rotate so that a portion of the belt moves from a substantially flat upward facing supply path to a substantially flat downward facing return path via a curved path between the supply path and the return path; and
    a plurality of blades disposed along a width of the belt, each of the blades being both (1) at least partially independently movable relative to the belt and (2) at least partially independently biased into contact with the belt;
    wherein the product removal system is configured to avoid vertically dropping a product removed from the continuous conveyor belt into further contact with the product removal system after the product removed from the continuous conveyor belt discontinues contact with a central portion of at least one of the plurality of blades.

11. The product removal system of claim 10, wherein the plurality of blades contact the belt along a top one half portion of the curved path.

12. The product removal system of claim 10, wherein at least one of the blades is connected to a weight that is configured to bias the at least one of the blades into the contact with the belt.

13. The product removal system of claim 10, wherein at least one of the blades is connected to a spring force source that is configured to bias the at least one of the blades into the contact with the belt.

14. The product removal system of claim 10, wherein the belt is a chain link belt.

15. A product removal system, comprising:
- a continuous conveyor belt configured to selectively rotate so that a portion of the belt moves from a substantially flat upward facing supply path to a substantially flat downward facing return path via a curved path between the supply path and the return path;
- a rod extending along a width of the belt; and
- a plurality of blades carried by the rod, each of the blades being (1) at least partially independently movable relative to the belt, (2) at least partially independently biased into contact with the belt, and (3) rotatable about a central axis of the rod;
- wherein the product removal system is configured to avoid vertically dropping a product removed from the continuous conveyor belt into further contact with the product removal system after the product removed from the continuous conveyor belt discontinues contact with a central portion of at least one of the plurality of blades.

16. The product removal system of claim 15, wherein at least one of the blades is carried by a frame that is rotatably connected to the rod.

17. The product removal system of claim 16, wherein the frame is configured to carry a weight and wherein the weight is movable along the frame to vary a distance between the weight and the central axis of the rod.

18. The product removal system of claim 17, wherein the at least one blade carried by the frame is movable along the frame to vary a distance between the frame and the conveyor belt.

19. The product removal system of claim 18, wherein the conveyor belt comprises a metal chain link belt and wherein the at least one blade carried by the frame comprises steel.

* * * * *